B. WALTER.
BRINE COOLER.
APPLICATION FILED DEC. 21, 1906.

937,344.

Patented Oct. 19, 1909.

Witness:
Chas. S. Lepley.
E. R. Rodd.

Inventor,
Bruce Walter
By J. W. H. Clay
his Atty.

UNITED STATES PATENT OFFICE.

BRUCE WALTER, OF PITTSBURG, PENNSYLVANIA.

BRINE-COOLER.

937,344.  Specification of Letters Patent.  Patented Oct. 19, 1909.

Application filed December 21, 1906. Serial No. 348,880.

*To all whom it may concern:*

Be it known that I, BRUCE WALTER, a citizen of the United States, residing at Pittsburg, in the State of Pennsylvania, have invented certain new and useful Improvements in Brine-Coolers, of which the following is a specification.

My invention relates to cooling and refrigerating apparatus, and particularly to the construction of the so-called brine coolers for lowering the temperature of non-freezing liquids by means of evaporation of a volatile fluid.

The primary objects of the invention are to increase the effective area of the conductor containing the brine by quickly eliminating bubbles of gas which are formed by absorption of the heat therefrom; to make more compact and efficient the piping of brine coolers; to quicken the action and simplify the construction, and generally to increase the efficiency of brine coolers. These objects and other advantages which will hereinafter appear I attain by means of the structure illustrated in a preferred form in the accompanying drawing.

Figure 1:
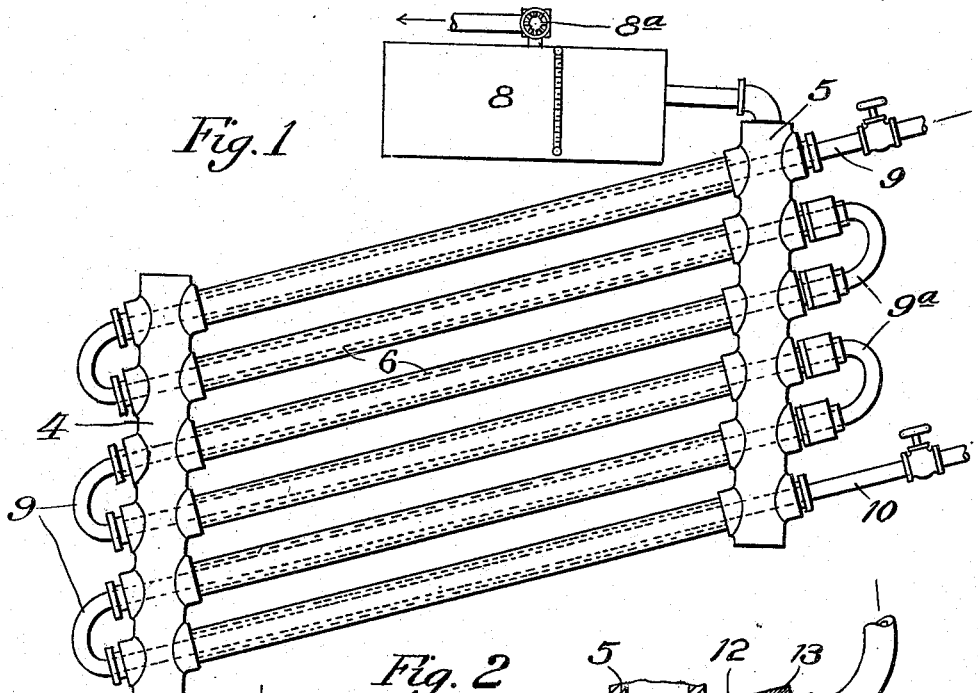
Figure 2:
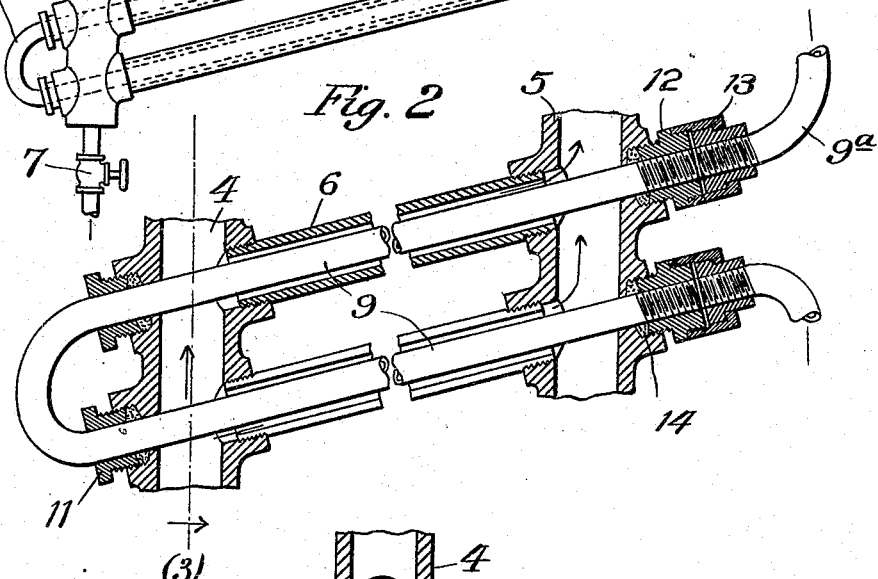
Figure 3:
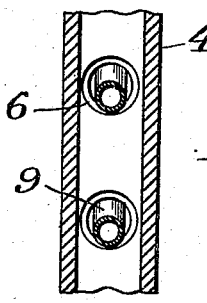

Figure 1 is a side elevation of a small unit of the cooler. Fig. 2 is a broken vertical section taken parallel to the plane of the picture in Fig. 1, showing the joints at the ends of the pipes, and Fig. 3 is a partial section taken on the line (3) in Fig. 2.

While my invention is illustrated by reference to its application to brine coolers of refrigerating apparatus, it will be understood as applicable to any apparatus where the heat from an internal conductor is utilized to evaporate a fluid in contact with the conductor. In the example illustrated, it is customary to use such liquids as ammonia at a low temperature, acting under reduced pressure as a refrigerant, which being brought into contact with a pipe containing a non-freezing material such as brine, takes up the heat by absorption from the brine pipe and thereby changes itself into gas and flows off carrying the latent heat. This usually is done by placing a coil of brine within a coil of ammonia, and the great draw-back to the efficiency of such apparatus is that when the ammonia "boils" the resulting gases must travel along the whole course of the brine coil before they escape, and thus take up a large amount of the area of the brine pipe which otherwise would be exposed to the cooling influence of the liquid ammonia. To avoid this difficulty, as shown in the drawings I employ an ammonia chamber consisting of casings 4, 5, which are joined together by pipes 6 and these pipes are placed at an angle to the horizontal as shown. Each pipe 6 is a separate and distinct pass-way from the inlet casing 4 to the outlet casing 5, and it will be observed that when gas is formed in the casing 4 or the pipes 6 it may immediately escape into and out of the casing 5 without traversing any other length of pipe. The brine is carried through the small pipe 9 which is arranged to pass alternately back and forth through alternate lengths of the pipe 6. Any means may be employed for connecting up these pipes, but I have shown the pipes 9 made in long U sections of which the two legs are run entirely through the casing 4 and end just outside the casing 5, while the respective ends of the U pipe are connected by bends 9ª, which may be attached by any ordinary form of union nut 13, while one part of the union, 12, may act at the same time as a packing plug to fit into the casing 5 as clearly shown in Fig. 2.

Preferably the brine will enter the top of the pipe 9 and travel in zig-zag fashion through the cooler emptying at 10, while the ammonia is led in at the reducing valve 7 to the casing 4 and passes through the various pipes 6 simultaneously to the casing 5 and thence out through a collecting drum 8 and outlet valve 8ª. The ammonia is thus applied to all the coils of the brine pipe at once and any gas which forms in the pipe 6 may escape immediately without impeding the operation of the remaining body of liquid ammonia by occupying space on the surface of the brine pipes.

The various advantages of these devices will be readily apparent to those familiar with the art; and it will be also evident that the same device is as useful condensing the refrigerant from gaseous form, as by introducing it into the top casing 5 as a gas, the parts condensed to liquid form will run off immediately through the outlet valve 7 and thus not occupy space on the inclosed pipes 9 which are to be exposed to the gas.

Having thus described my invention and illustrated its use what I claim as new and desire to secure by Letters Patent is the following:

1. In a brine cooler, the combination with a pair of common casings having free vertical passages and lateral openings, of a series of inclined pipes connected with said openings, and a continuous pipe passing through the several inclined pipes and the casings in succession, substantially as described.

2. The combination of a series of inclined chambers connected at their two ends with vertical casings common to all said chambers, a continuous pipe for non-freezing fluid passing through each of said chambers and sealed in the casings, whereby bubbles formed may pass off from each inclined chamber without traversing others, the bends of the continuous pipe being removable.

In testimony whereof I have hereunto signed my name in the presence of the two subscribed witnesses.

BRUCE WALTER.

In presence of—
F. W. H. CLAY,
H. M. CORWIN.